United States Patent
Fan et al.

(10) Patent No.: US 11,688,148 B2
(45) Date of Patent: *Jun. 27, 2023

(54) METHODS AND SYSTEMS FOR SELECTION OF OBJECTS

(71) Applicant: HUAWEI TECHNOLOGIES CO., LTD., Shenzhen (CN)

(72) Inventors: Szu Wen Fan, Markham (CA); Taslim Arefin Khan, Scarborough (CA); Wei Li, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,435

(22) Filed: Sep. 8, 2022

(65) Prior Publication Data

US 2023/0013860 A1    Jan. 19, 2023

Related U.S. Application Data

(63) Continuation of application No. 17/127,022, filed on Dec. 18, 2020, now Pat. No. 11,475,642.

(51) Int. Cl.
*G06T 19/00* (2011.01)
*G06F 17/16* (2006.01)
*G06T 15/06* (2011.01)
*G06F 3/04842* (2022.01)

(52) U.S. Cl.
CPC ........ *G06T 19/006* (2013.01); *G06F 3/04842* (2013.01); *G06F 17/16* (2013.01); *G06T 15/06* (2013.01)

(58) Field of Classification Search
None
See application file for complete search history.

(56) References Cited

U.S. PATENT DOCUMENTS

| 10,027,888 B1 | 7/2018 | Mackraz |
| 10,620,721 B2 * | 4/2020 | Goldberg ............... G08C 23/04 |
| 2020/0226814 A1 | 7/2020 | Tang et al. |

FOREIGN PATENT DOCUMENTS

| CN | 105912110 A | 8/2016 |
| CN | 108431736 A | 8/2018 |
| CN | 109086726 A | 12/2018 |
| CN | 109448050 A | 3/2019 |

OTHER PUBLICATIONS

Ping et al., "Effects of Shading Model and Opacity on Depth Perception in Optical See-through Augmented Reality", Society for Information Display. Feb. 2020.
Argelaguet, Ferran, and Carlos Andujar. "A survey of 3D object selection techniques for virtual environments." Computers & Graphics 37.3. 2013.

* cited by examiner

*Primary Examiner* — Nicholas R Wilson

(57) ABSTRACT

Methods and systems for selecting an object or location in an extended reality (XR) environment or physical environment are described. A first origin, including a first position and a first direction, and a second origin, including a second position and a second direction, are obtained by at least one sensor. An intersection of a first ray, casted from the first origin, and a second ray, casted from the second origin, is determined. A selected object or selected location is identified, based on the determined intersection. An identification of the selected object or the selected location is outputted.

20 Claims, 10 Drawing Sheets

METHODS AND SYSTEMS FOR SELECTION OF OBJECTS

CROSS-REFERENCE TO RELATED APPLICATIONS

The present disclosure is a continuation of U.S. patent application Ser. No. 17/127,022, filed Dec. 18, 2020, entitled "METHODS AND SYSTEMS FOR SELECTION OF OBJECTS".

FIELD

The present disclosure relates to methods and systems for human interaction with an electronic device, including selection of distal objects in an extended reality environment.

BACKGROUND

Extended reality (XR) is an umbrella term that is intended to cover different technologies in which a human user is provided with at least some sensory inputs (e.g., visual display, audio sounds, tactile feedback, etc.) that are virtual (i.e., generated by a computing system and not reflective of the user's real physical environment). XR covers technologies including virtual reality (VR), augmented reality (AR) and mixed reality (MR). XR thus covers technologies in which a user interacts with an environment that is entirely computer-generated (e.g., VR) as well as technologies in which a user interacts with an environment that has virtual and real-world components (e.g., AR or MR). The virtual environment may be referred to as a scene.

A challenge of XR systems when compared to traditional desktop or touch screen systems is that the location of objects (including virtual objects) for user interaction is not confined to the user's immediate vicinity nor a single 2D plane, but is rather spatially located in the 3D space surrounding the user. In particular, an object can be located at a distance that is outside the reach distance (or motor space) of a user. Such an object may be referred to as a distal object. Interaction with a distal object typically begins with a distal selection, and is a basis of interaction in XR.

Current techniques for XR distal selection include ray casting. Using ray casting for XR distal selection typically involves projecting (also referred to as casting) a virtual ray from the user's standpoint into the XR scene. When the casted virtual ray intersects a distal object in the scene, that object may be considered to be provisionally selected, with selection of the object confirmed by a button press, gesture, maintaining the provisional selection for a predetermined time, or through other techniques.

A drawback of existing ray casting methods for object selection include the challenge that the target distal object may be partially or fully occluded by other virtual objects that are closer to the user, which may make it difficult or impossible for a casted virtual ray to reach the target distal object. The user may be required to change the origin point of ray casting by changing the user standpoint or the user may be required to first select the occluding object to move the occluding object away, both of which can be tedious or frustrating for a user. Some existing XR systems may attempt to solve the problem of occluding objects by enabling the virtual ray to be casted through occluding virtual objects. However, such a solution leads to the problem that the system may not have information about the depth (or distance) to which the ray should be casted to select the desired target object. Typically, an additional disambiguation step is required to precisely select the finite depth of the ray, such as the user scrolling on a controller to change ray depth until the desired target object is reached by the ray. This can also be tedious for a user and may not be practical for selection of many different objects at different depths.

Another drawback of existing ray casting methods for object selection is that, as the ray is casted at an angle from the user, slight changes in the angle of ray casting at the origin point can translate into large changes in position at a distal location. This can lead to inaccuracy and imprecision when attempting to select a distal object. Some ray casting methods attempt to address this challenge by casting a cone corresponding to the angle of the casted ray, to select all objects within the casted cone. Again, an additional disambiguation step is required to select the specific desired object. This can be tedious and inefficient, particularly if the virtual objects are densely positioned in the XR environment.

Similar challenges are encountered in providing a user interface that enables object selection in a non-XR environment (i.e., a physical environment without virtual objects). For example, many users currently have computer-enabled real-world objects (also referred to as smart objects or smart devices) in their homes. Typical methods for selecting (or otherwise interacting) with a computer-enabled object include manually activating the object (e.g., turning on a power switch), selecting the object via a software application, or using voice commands. However, manual activation of the computer-enabled object may require a user to move to the location of the object, which can be time-consuming and/or tedious; selecting the object via a software application may require navigation to specific software menus, which may also be time-consuming and/or tedious; and using voice commands may not be suitable in all environments (e.g., the user may not wish to be heard, or may be in a noisy environment where voice commands may be obscured).

Accordingly, it would be useful to provide methods and systems for more precise and efficient selection of objects, including selection of objects in XR environments.

SUMMARY

In various examples, the present disclosure describes methods and systems that enable more precise and time efficient selection of objects or locations. The disclosed methods and systems enable selection of objects in an XR environment, or in a physical environment. The disclosed methods and system avoid the problems of occlusion by non-target objects and lack of precision by using ray casting from at least two different origins. The actual intersection (in the case where the rays are not skew) or projected intersection (in the case where the rays are skew) of the rays in the 3D environment is used to determine the object or location that is selected. No additional disambiguation step may be required to determine the precise selected object or location. The selection may be a provisional selection, and a further process (e.g., receipt of a confirmation gesture or confirmation input, or expiry of a timer) may be used to confirm selection of the object or location. This provides the technical effect that user selection of an object or location in the XR or physical environment may be received using fewer user inputs, thus enabling faster processing of user interactions.

In some examples implemented in an XR environment, to enable easier visualization of the casted rays, virtual objects intersected by the path of each casted ray may be rendered with lower opacity. Opacity of virtual objects may be dynamically adjusted (e.g., rendered translucent) in response to changes in ray directions (e.g., as the users changes the origins of the casted rays). Rendering of the selected virtual object may also be dynamically adjusted (e.g., rendered in a different color). This provides the technical effect that the XR environment is rendered in a unique way, which enables the user to visualize the selected object or location, regardless of any occluding virtual objects.

Examples of the present disclosure may be implemented in XR systems (including AR systems, VR systems and/or MR systems), as well as non-XR systems such as handheld devices (e.g., smartphone, tablets, etc.), wearable devices (e.g., smart glasses, smart watch, smart ring, etc.), and/or desktop computing systems. Any system that involves selection of an object or location in a 3D environment may benefit from the examples of the present disclosure.

In some examples, the present disclosure describes a method for selecting an object. The method includes: obtaining, by at least one sensor, a first origin, including a first position and a first direction, and a second origin, including a second position and a second direction; determining an intersection of a first ray casted from the first origin and a second ray casted from the second origin; identifying a selected object or selected location, based on the determined intersection; and outputting an identification of the selected object or the selected location.

In any of the above examples, the selected object or the selected location may be in an extended reality (XR) environment, and the method may include: identifying one or more intersected virtual objects in the XR environment that are intersected by at least one of the first ray or the second ray; and adjusting opacity of the one or more intersected virtual objects, to render the one or more intersected virtual objects translucent.

In any of the above examples, determining the intersection of the first ray and the second ray may include computing an actual intersection point of the first ray and the second ray.

In any of the above examples, determining the intersection of the first ray and the second ray may include computing a projected intersection point of the first ray and the second ray, the first and second rays being skew.

In any of the above examples, computing the projected intersection point may include: computing a shortest vector between the first ray and the second ray; and computing a point along the shortest vector as the projected intersection point.

In any of the above examples, the method may include: computing the point along the shortest vector after determining that a magnitude of the shortest vector is within a predefined threshold.

In any of the above examples, identifying the selected object may include: identifying one or more provisionally selected objects, based on the determined intersection; and receiving confirmation of one selected object from among the one or more provisionally selected objects.

In any of the above examples, identifying one or more provisionally selected objects may include: projecting a sphere with a predetermined radius from the determined intersection; and identifying the one or more provisionally selected objects coinciding with the projected sphere.

In any of the above examples, the first origin may be obtained by the at least one sensor based on a tracked first position, orientation or pose of a first body part of a user, and the second origin may be obtained by at least one same or different sensor based on a tracked second position, orientation or pose of a second body part of the user.

In any of the above examples, the first body part and the second body part may be each selected from one of: a head, a first hand, or a second hand of the user, and the first body part and the second body part may be different body parts of the user.

In any of the above examples, the selected object may be a virtual object rendered in an extended reality (XR) environment, or may be a real-world object in the XR environment.

In any of the above examples, the selected object may be a real-world object in a physical environment.

In any of the above examples, the at least one sensor may include at least one of: a sensor of a handheld device; a sensor of a wearable device; a sensor of a smart device; or a sensor of a tracking system.

In some examples, the present disclosure describes a computing system including: a processing device coupled to a memory storing machine-executable instructions thereon. The instructions, when executed by the processing device, causes the computing system to perform any of the methods described above.

In any of the above examples, the computing system may be a head-mounted display (HMD) device, a wearable device, a handheld device, a smart device, a tracking system, or a desktop device.

In some examples, the present disclosure describes a computer-readable medium having machine-executable instructions stored thereon. The instructions, when executed by a processing device of a computing system, cause the computing system to selecting an object in an extended reality (XR) environment by performing any of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In various examples, the present disclosure describes methods and systems related to user interactions in extended reality (XR) environments as well as non-XR environments (i.e., physical environments without virtual objects). The disclosed examples may be used for selection of distal objects in an XR environment. The disclosed examples may be used for selection of real-world objects in a physical environment. The disclosed examples may also be used for selection of any 3D location in an XR or physical environment. Examples of the present disclosure may be implemented in suitable XR systems, including augmented reality (AR) systems, virtual reality (VR) systems, or mixed reality (MR) systems. Examples of the present disclosure may also be implemented in non-XR computing systems. Examples of suitable computing systems (which may or may not be XR-enabled) include wearable devices (e.g., head-mounted display (HMD) devices, smart glasses, smart watches, smart rings, etc.) and/or handheld devices (e.g., smartphones, tablets, etc.), among others. Examples of the present disclosure may also be implemented in non-wearable systems, such as desktop computing systems, laptop computing systems, workstations, smart appliances, tracking systems, and other computing systems.

The present disclosure describes examples in the context of an XR system including a head tracking device (e.g., a HMD device) and/or a hand tracking device (e.g., a handheld controller, a wearable device (such as a smartwatch or smart ring), a smartphone, or a motion tracking camera). However, it should be understood that the present disclosure is not limited to such embodiments. For example, any system (including systems not running an XR application) capable of determining a first ray origin and direction (e.g., using any technique for head tracking or eye tracking) and determining a second ray origin and direction (e.g., using any technique for hand tracking) may be used to implement examples of the present disclosure.

Figure 1A:
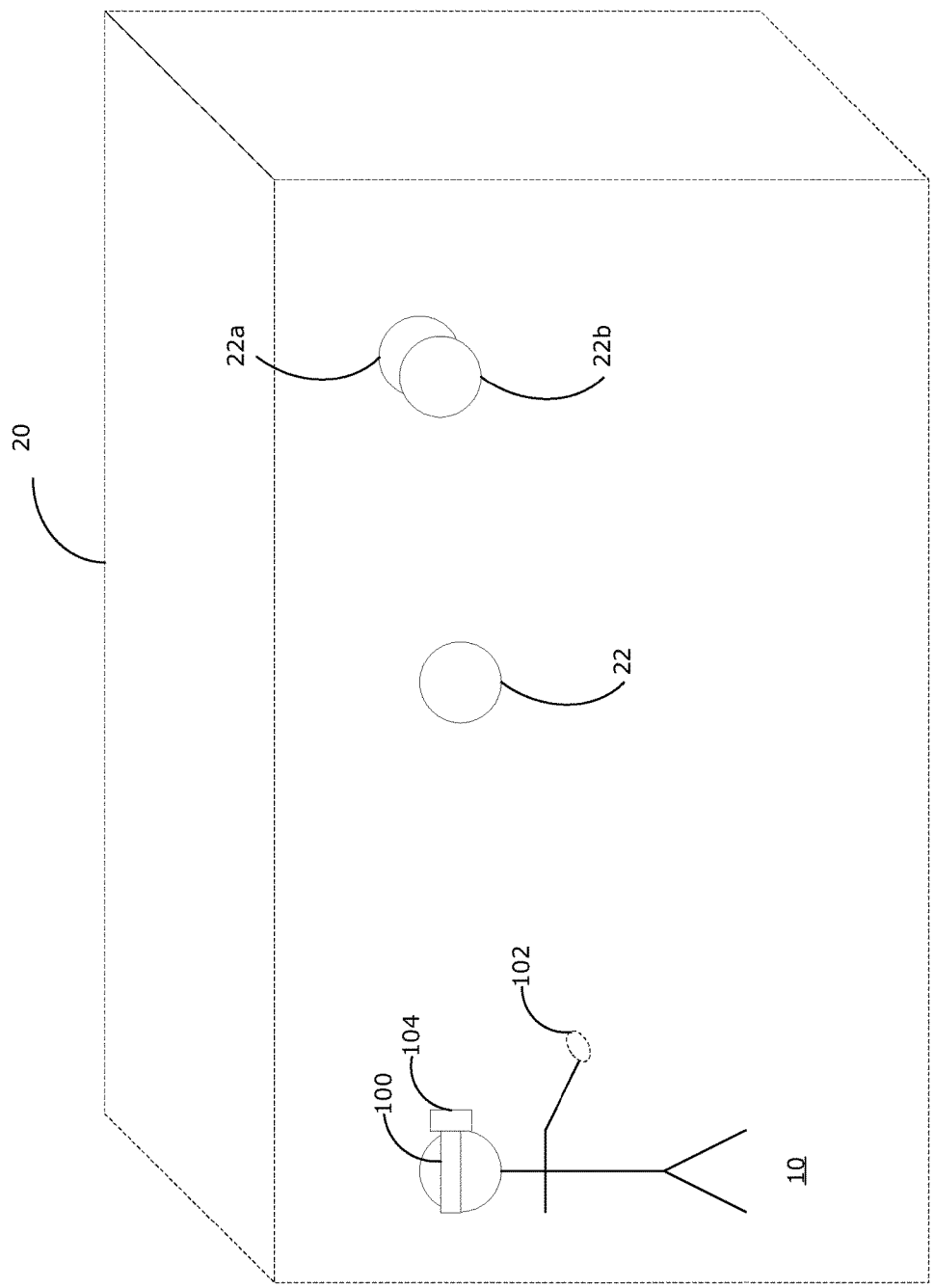
FIG. 1A is a block diagram illustrating a user interacting with an example XR environment.

FIG. 1A shows an example of a user 10 interacting with an XR environment 20 (also referred to as an XR scene). In this example, the XR environment 20 is a virtual environment generated by a computing system 100. For example, the computing system 100 may be a wearable device such as a HMD device as shown in FIG. 1. In other examples, the XR environment 20 may be generated by a non-wearable computing system 100 (e.g., a desktop computing system).

It should be noted that the XR environment 20 is virtual or at least partially virtual. That is, the objects 22 in the XR environment 20 include virtual objects that are not in the actual physical environment of the user 10, and may also include real-world objects (e.g., where the XR environment 20 is an AR environment). An object 22 that is a real-world object may be positioned among, occluded by and/or overlaid by another object 22 that is a virtual object. The XR environment 20 may be viewed by the user 10 via a display 104 coupled to or integrated with the computing system 100. The display 104 may provide an immersive view of the XR environment 20 (e.g., providing a field-of-view (FOV) ranging from 40 to 110 degrees), or a more restricted view of the XR environment 20 (e.g., a handheld display 104 may provide a moveable viewport for displaying portions of the XR environment 20). The display 104 may be a high resolution organic light-emitting diode (OLED) display or liquid crystal display (LCD), for example. In some examples, the display 104 may be capable of displaying stereoscopic graphics (e.g., the display 104 displays separate stereoscopic graphics to the left and the right eyes), and the XR environment 20 may be an immersive 3D environment.

In this simplified diagram, the XR environment 20 includes a plurality of objects 22 which are distal from the user 10 (i.e., out of reach of the user 10). In particular, a target object 22a that the user 10 wishes to select may be partially or fully occluded by another object 22b, from the viewpoint of the user 10. The user 10 may select and/or interact with objects 22 in the XR environment 20. For example, a user 10 may select an object 22 that is a virtual object, to move the object 22 or provide commands to the object. The user 10 may also select and/or interact with an object 22 that is a real-world object via the XR environment 20. For example, the object 22 that is a real-world object may be a computer-enabled object (e.g., an Internet of things (IoT) device) that is capable of receiving user commands via the XR environment 20. When the computing system 100 determines that the user 10 has selected the computed-enabled real-world object in the XR environment 20 (as discussed further below), the computing system 100 may send commands to the computer-enabled real-world object indicating the user selection. After selection, the computer-enabled real-world object may communicate with the computing system 100 to enable the user 10 to further interact with the computer-enabled real-world object (e.g., to display to the user 10, via the display 104, a menu of possible commands for the computer-enabled real-world object). The user 10 may also select a real-world object that is not computer-enabled but is detectable by the computing system 100 (e.g., an object that is detected using computer vision, or an object whose boundary has been predefined and mapped in the computing system 100). For example, the user 10 may wish to select a real-world object as a reference for positioning or generating a virtual object.

The user 10 may interact with the XR environment 20 via inputs that are received by the computing system 100. For example, the user 10 may provide input by changing the position and/or orientation of the user 10. In the present disclosure, the term pose may be used to encompass a combination of position and orientation. If the computing system 100 is a wearable device, a change in position, orientation or pose of the user 10 may be detected by a sensor (e.g., accelerometer, gyroscope, magnetometer, inertial measurement unit (IMU), etc.) of the computing system 100 and may be sensed as input. For example, a sensor integrated with the computing system 100 may be capable of tracking a head of the user 10 in three degrees-of-freedom (DOF) or six DOF.

In some examples, a controller 102 (e.g., a handheld controller) may be coupled to the computing system 100, and the controller 102 may be used by the user 10 to provide input (e.g., using a button, joystick, or other mechanism). The optional controller 102 may include a sensor (e.g., accelerometer, gyroscope, magnetometer, IMU, etc.) capable of detecting the position, orientation or pose of the user 10 (e.g., specifically the position, orientation or pose of the user's hand) in three DOF or six DOF, and may communicate this sensed data which is received as input by the computing system 100.

In some examples, instead of a controller 102 (which may be designed for interacting with the XR environment 20), another computer-enabled device (e.g., wearable device such as a smartwatch or smart ring, or handheld device such as a smartphone) may be held in or worn near the hand of the user 10, to detect the position, orientation or pose of the user's hand.

In some examples, a change in position, orientation or pose of the user 10 may be detected by an external tracking system (e.g., an infrared tracking system, or computer vision-based tracking system) that is coupled to the computing system 100. The external tracking system (not shown) may track the position or orientation (e.g., in three DOF), or pose (e.g., in six DOF) of the user 10, for example using active or passive markers (e.g., markers attached to a wearable computing system 100, attached to a handheld controller 102, and/or attached directly to the user 10), or using non-marker based computer vision (e.g., using a machine learning-based algorithm (such as a simultaneous localization and mapping (SLAM) algorithm, or a trained neural network such as that used in Azure Kinect™) to detect the user 10). The external tracking system may communicate data about the tracked position, orientation or pose of the user 10, which is received as input by the computing system 100.

Various techniques and technologies may be used to receive inputs, to enable the user 10 to interact with the XR environment 20, and the present disclosure is not limited to the examples discussed above.

In response to input representing a change in position, orientation or pose of the user 10, the computing system 100 may re-render objects 22 that are virtual objects in the XR environment 20, to reflect the changed position, orientation or pose of the user 10. Input data representing the position, orientation or pose of the user 10 may be received continuously in real-time by the computing system 100, to ensure a seamless and smooth XR experience for the user 10.

Figure 1B:
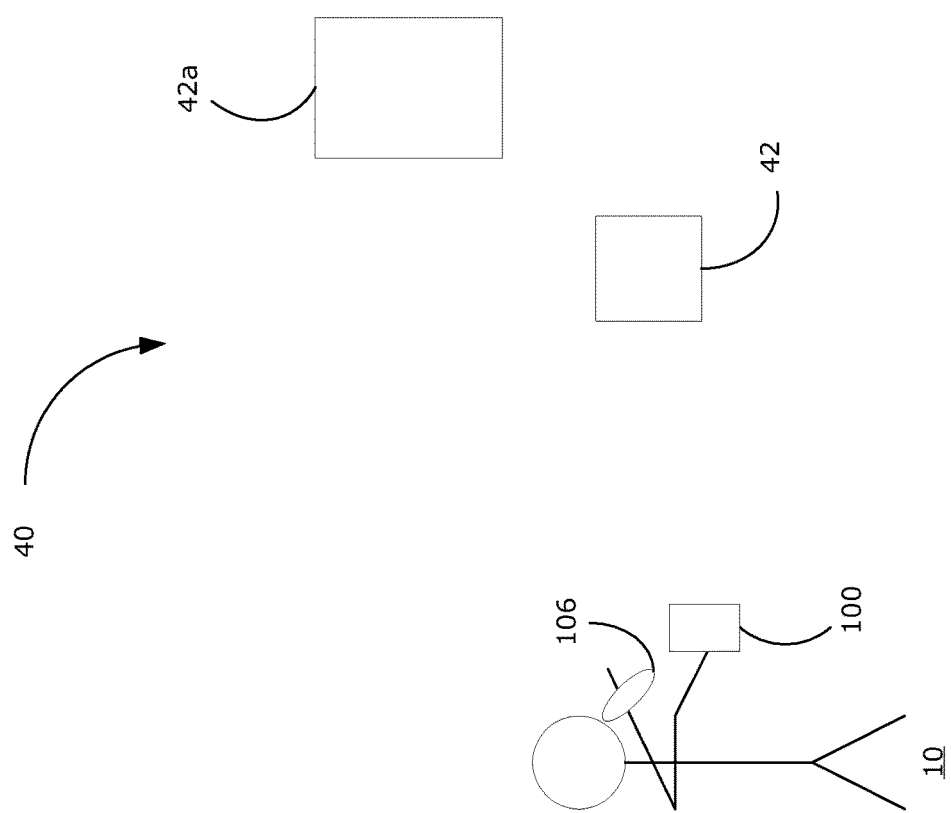
FIG. 1B is a block diagram illustrating a user in a non-XR environment.

FIG. 1B shows an example of the user 10 interacting with a physical environment 40 (i.e., having no virtual objects). In this example, the physical environment 40 includes one or more physical (or real-world) objects 42, which may include computer-enabled real-world object(s).

In the example shown, the computing system 100 may be a handheld computing system 100 (e.g., a smartphone or a tablet), which may or may not be capable of rendering an XR environment (e.g., an AR environment). For example, the computing system 100 may be capable of supporting both user interaction in the XR environment 20 and user interaction in the physical environment 40, and may be capable of switching between displaying a view (e.g., via a display 104 (not shown in FIG. 1B)) of the XR environment 20 and a view of the physical environment 40. The computing system 100 may also communicate with one or more input/output (I/O) devices 106, which may be a wearable device (e.g., a smart watch, smart ring, smart glasses, etc.), or a handheld device (e.g., the controller 102 described previously). The I/O device(s) 106 may include sensors or may be sensed by the computing system 100, to enable tracking of the I/O device 106 in three DOF or six DOF.

In this simplified diagram, the physical environment 40 includes a plurality of objects 42, including a target object 42a that the user 10 wishes to select. For example, a user 10 may select a target object 42a that is a computer-enabled real-world object (e.g., a smart appliance or IoT device), to provide commands to the object. The user 10 may also select a target object 42a that is not computer-enabled but is detectable by the computing system 100 (e.g., an object that is detected using computer vision, or an object whose boundary has been predefined and mapped in the computing system 100). If the target object 42a is a computer-enabled object, the user may select and interact with the target object 42a via commands from the computing system 100, similar to that described above with reference to FIG. 1A.

If the computing system 100 is a wearable device or a handheld device, a change in position, orientation or pose of the user 10 may be detected by a sensor (e.g., accelerometer, gyroscope, magnetometer, inertial measurement unit (IMU), etc.) of the computing system 100 and may be sensed as input. For example, a sensor integrated with the computing system 100 may be capable of tracking a head of the user 10 in three degrees-of-freedom (DOF) or six DOF.

In some examples, the I/O device 106 may be used by the user 10 to provide inputs to and/or receive outputs from the computing system 100. The optional I/O device 106 may include a sensor (e.g., accelerometer, gyroscope, magnetometer, IMU, etc.) capable of detecting the position, orientation or pose of the user 10 (e.g., specifically the position, orientation or pose of the user's hand) in three DOF or six DOF, and may communicate this sensed data which is received as input by the computing system 100.

In some examples, a change in position, orientation or pose of the user 10 may be detected by an external tracking system (e.g., an infrared tracking system, or computer vision-based tracking system) that is coupled to the computing system 100. The external tracking system (not shown) may track the position or orientation (e.g., in three DOF), or pose (e.g., in six DOF) of the user 10, for example using active or passive markers (e.g., markers attached to a wearable or handheld computing system 100, attached to a wearable or handheld I/O device 106, and/or attached directly to the user 10), or using non-marker based computer vision (e.g., using a machine learning-based algorithm (such as a simultaneous localization and mapping (SLAM) algorithm, or a trained neural network such as that used in Azure Kinect™) to detect the user 10). The external tracking system may communicate data about the tracked position, orientation or pose of the user 10, which is received as input by the computing system 100. Various techniques and technologies may be used to receive inputs, to enable the user 10 to interact with the physical environment 40, and the present disclosure is not limited to the examples discussed above.

Figure 2:
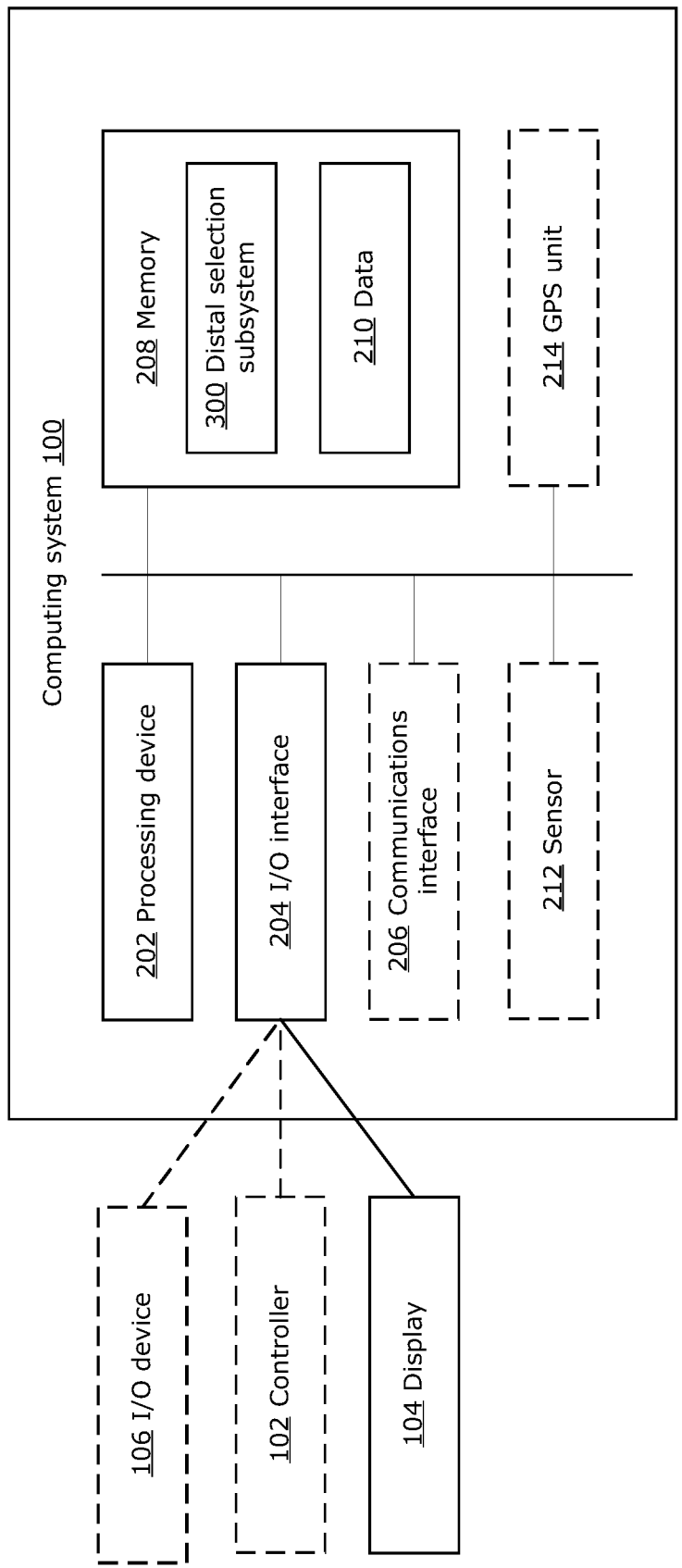
FIG. 2 is a block diagram illustrating some components of an example computing system, in accordance with examples of the present disclosure.

FIG. 2 is a block diagram showing some components of a computing system 100 which may be used to implement examples disclosed herein. Although an example embodiment of the computing system 100 is shown and discussed below, other embodiments may be used to implement examples disclosed herein, which may include components different from those shown. Although FIG. 2 shows a single instance of each component, there may be multiple instances of each component shown.

The computing system 100 may be a wearable device (e.g., head-mounted display (HMD) devices, smart watches, smart rings, smart glasses, etc.), a handheld device (e.g., smartphones, tablets, etc.), or a non-wearable device (e.g., such as desktop computing systems, laptop computing systems, workstations, smart appliances, tracking systems, etc.), among others. In some examples, the computing system 100 may be a non-wearable device that communicates with a wearable device. Examples of the present disclosure may be implemented in any suitable computing system that is capable of performing ray casting, for example.

The computing system 100 includes one or more processing devices 202, such as a processor, a microprocessor, an application-specific integrated circuit (ASIC), a field-programmable gate array (FPGA), a dedicated logic circuitry, a dedicated artificial intelligence processor unit, or combinations thereof. The computing system 100 also includes one or more input/output (I/O) interfaces 204, which interfaces with input devices such as the optional controller 102, optional I/O device 106 and output devices such as the display 104. The computing system 100 may include other input devices (e.g., buttons, microphone, touchscreen, keyboard, etc.) and other output devices (e.g., speaker, vibration unit, etc.). The optional controller 102, optional I/O device 106 and the display 104 may be external to the computing system 100, as illustrated in FIG. 2. In other examples, the optional controller 102, optional I/O device 106 and/or the display 104 may be integrated with the computing system 100 (e.g., the computing system 100 may be a HMD device with a built-in display 104, or may be a wearable device such as smart glasses or smart watch).

The computing system 100 may include one or more optional communications interfaces 206 for wired or wireless communication with an external system or network (e.g., an intranet, the Internet, a P2P network, a WAN and/or a LAN). The communications interface(s) 206 may enable communication using wired links (e.g., Ethernet, etc., using one or more cables) and/or wireless links (e.g., Wi-Fi, Bluetooth, etc., using one or more antennas) for intra-network and/or inter-network communications. The communications interface(s) 206 may enable the computing system 100 to communicate with an external system, such as an external tracking system, to receive input data (e.g., data representing a tracked position, orientation or pose of the user 10).

The computing system 100 includes one or more memories 208, which may include a volatile or non-volatile memory (e.g., a flash memory, a random access memory (RAM), and/or a read-only memory (ROM)). The non-transitory memory(ies) 208 may store instructions for execution by the processing device(s) 202, such as to carry out examples described in the present disclosure. For example, the memory(ies) 208 may include instructions for executing a distal selection subsystem 300. The memory(ies) 208 may include other software instructions, such as for implementing an operating system, rendering the XR environment 20 (if applicable) and other applications/functions. The memory(ies) 208 may also include data 210, such as data representing the XR environment 20 to be rendered (if applicable) and provided as output via the display 104.

In some examples, the computing system 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive or cloud storage in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The computing system 100 may include one or more sensors 212, which may include an accelerometer, a gyroscope, a magnetometer, an IMU (which may be a combination of accelerometer, gyroscope and/or magnetometer), among others. The sensor(s) 212 may sense the position, orientation or pose of the user 10 and generate sensor data representing the position, orientation or pose of the user 10. In some examples the sensor(s) 212 may also include an eye tracking unit (e.g., an optical eye-tracking sensor) that senses rotation of the eyes of the user 10 and generates sensor data representing the direction (e.g., in three DOF) of the eyes. The computing system 100 may also include an optional global positioning system (GPS) unit 214, which may communicate with a global navigation system (e.g., via the communications interface(s) 206) to generate data representing the position, orientation or pose of the user 10.

Figure 3:
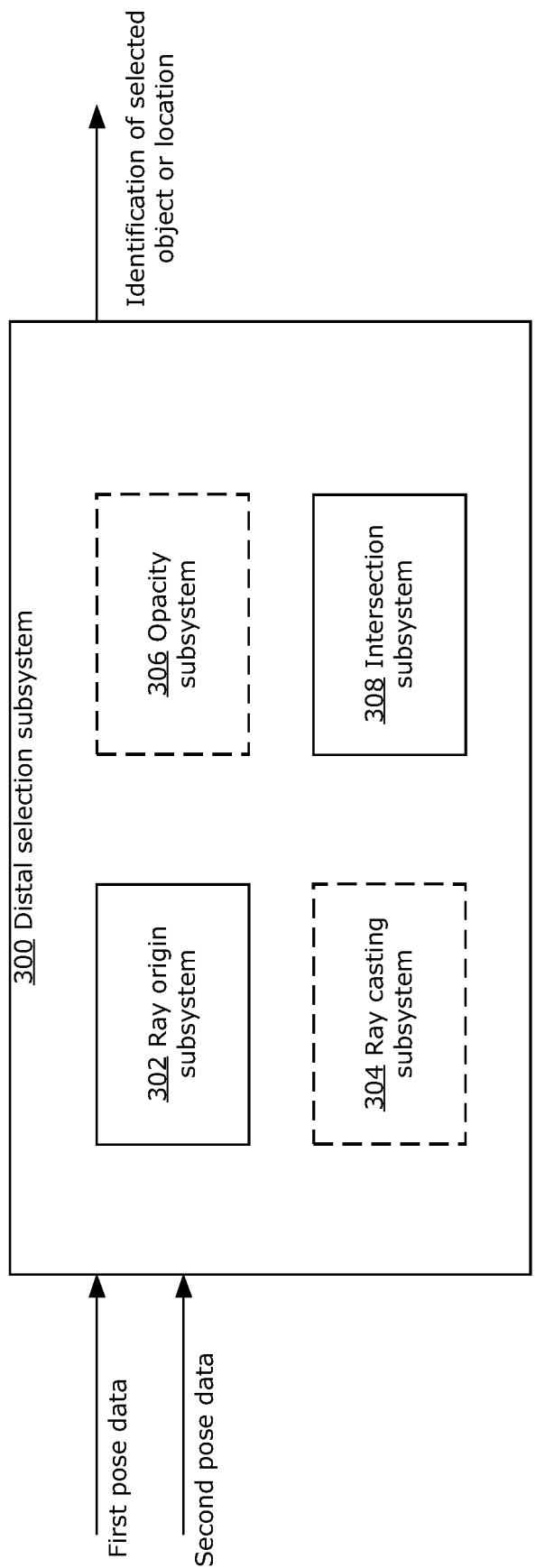
FIG. 3 is a block diagram of an example distal selection subsystems, in accordance with examples of the present disclosure.

FIG. 3 is a block diagram illustrating some example subsystems of the distal selection subsystem 300. In this example, the distal selection subsystem 300 may be implemented using a ray origin subsystem 302, an optional ray casting subsystem 304, an optional opacity subsystem 306 and an intersection subsystem 308. Although FIG. 3 illustrates distinct subsystems 302, 304, 306 and 308 within the distal selection subsystem 300, this is not intended to be limiting. The operations of the distal selection subsystem 300, as disclosed herein, may be implemented using greater or fewer number of subsystems. Functions described as being performed using a particular one of the subsystems 302, 304, 306 and 308 may be performed by a different one of the subsystems 302, 304, 306 and 308. In some examples, the distal selection subsystem 300 may not include any distinct subsystems. Instead, the functions of the subsystems 302, 304, 306 and 308 may be considered functions of the overall distal selection subsystem 300.

Figure 4:
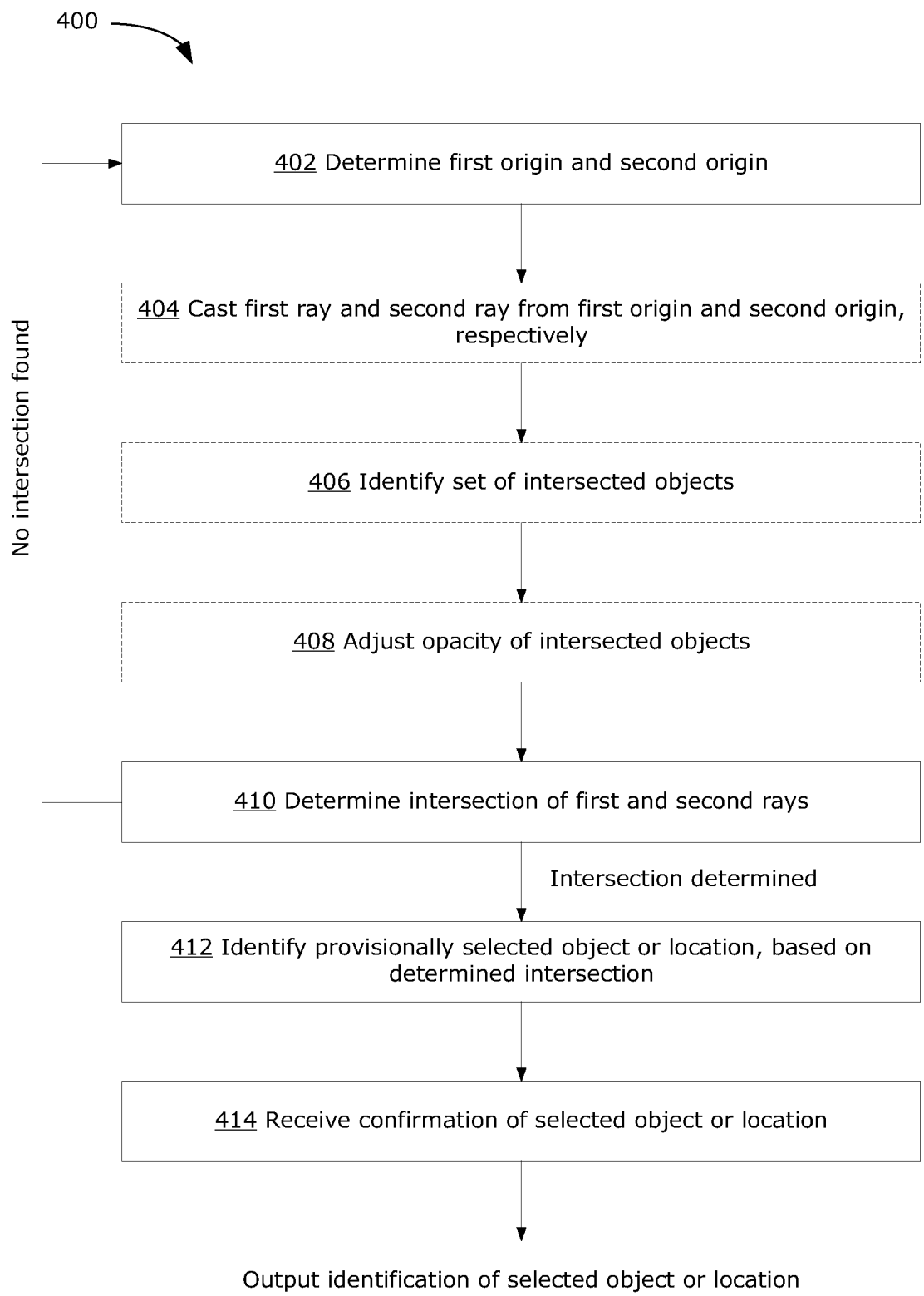
FIG. 4 is a flowchart illustrating an example method for object or location selection, in accordance with examples of the present disclosure.

FIG. 4 is a flowchart illustrating an example method 400, which may be performed by the computing system 100 using the distal selection subsystem 300 (e.g., by the processing device 202 executing instructions in the memory 208 for implementing functions of the distal selection subsystem 300). For ease of understanding, FIGS. 3 and 4 will be discussed together. As will be understood from the following discussion, the method 400 may enable selection of an object or location in the XR environment 20 or the physical environment 40.

The distal selection subsystem 300 receives a set of first pose data and a set of second pose data, and outputs data representing a selected object or location. The set of first pose data may represent the position, orientation or pose of a first body part of the user 10 and the set of the second pose data may represent the position, orientation or pose of a second body part of the user 10, where the first and second body parts are different body parts of the user 10. Various body parts of the user 10 may be tracked to generate the sets of first and second pose data. The first body part may be a head of the user 10 and the second body part may be a hand of the user 10; the first body part may be a first hand of the user 10 and the second body part may be a second hand of the user 10; the first body part may be the eyes of the user 10 and the second body part may be a hand of the user 10; among other possibilities. It should be noted that, although referred to as the first and second pose data, the first and/or second pose data may each independently represent only position data (e.g., in three DOF), only orientation data (e.g., in three DOF), or both position and orientation data (e.g., in six DOF).

At step 402, first and second origins for casting (or projecting) of first and second virtual rays are determined. For simplicity, the following discussion will refer to virtual rays simply as rays. Step 402 may be performed by executing the ray origin subsystem 302. The first and second origins may be computed from the first and second pose data, respectively. In some existing computing systems 100 (e.g., in wearable devices such as HMD devices), the tracking of the user's view (e.g., indicated by the position, orientation or pose of the user's head) may be performed continuously. Further, in some existing computing systems 100 that use a handheld controller 102 or that communicate with a wearable I/O device 106, the position, orientation or pose of the controller 102 or I/O device 106 may be tracked continuously. As well, some tracking systems (e.g., infrared tracking systems or optical tracking systems) may continuously track the position, orientation or pose of body parts of the user 10 (e.g., the head and hands of the user 10). Accordingly, the set of first pose data and the set of second pose data may be updated continuously (e.g., at regular and frequent time intervals, such as every 10 ms). The sets of first and second pose data may have any suitable format. For example, the sets of first and second pose data may each be unprocessed sensor data (e.g., generated by the sensor(s) 212 of the computing system 100), or may be processed data (e.g., sensor data that has been processed by an algorithm, such as simultaneous localization and mapping (SLAM) algorithm, to map to a common frame of reference and/or to remove noise).

The set of first pose data and the set of second pose data may be provided from different sources (e.g., from different sensors on the wearable computing system 100 and/or the handheld controller 102, respectively; or from different sensors on the computing system 100 and/or the I/O device 106). For example, the set of first pose data, which may represent the position, orientation or pose of the head of the user 10, may be provided by an IMU in the wearable computing system 100, a wearable sensor external of the computing system 100, an external head tracking system, or an optical SLAM preprocessing unit of the computing system 100. The set of second pose data, which may represent the position, orientation or pose of the hand of the user 10, may be provided by a sensor in the handheld controller 102 or I/O device 106, an external hand tracking system, or other wearable sensor.

In some examples, the set of second pose data may be provided by a HMD device (which may also be the computing system 100). For example, if the hand of the user 10 is within the FOV of the HMD device, a sensor (e.g., an optical sensor, if a trackable marker is attached to the hand) or a computer vision algorithm may detect the position, orientation or pose of the hand and generate the second pose data accordingly.

The sets of first and second pose data may be obtained by the computing system 100 in various ways, some of which are discussed herein. For example, the computing system 100 may be a handheld computing system having internal sensors to detect the position, orientation or pose of the hand of the user 10 as the set of first pose data, and the computing system 100 may communicate with a wearable I/O device 106 (having internal sensors) to receive the position, orientation or pose of the head or another hand of the user 10 as the set of second pose data.

In another example, the computing system 100 may be a wearable computing system (e.g., smart glasses or smart watch) having internal sensors to detect the position, orientation or pose of the head or hand of the user 10 as the set of first pose data, and may communicate with another wearable I/O device 106 (having internal sensors) to receive the position, orientation or pose of another hand of the user 10 as the set of second pose data.

In another example, the computing system 100 may be a wearable computing system (e.g., smart glasses or smart watch) having internal sensors to detect the position, orientation or pose of the head or hand of the user 10 as the set of first pose data, and may detect (e.g., using computer vision, or by tracking markers on the user 10) the position, orientation or pose of another hand (within the FOV of the computing system 100) as the set of second pose data.

In another example, the computing system 100 may be a desktop computing system that may receive the sets of first and second pose data via different input modalities (e.g., via mouse input and via eye-tracking input). In the example, the computing system 100 may be a desktop computing system that communicates with or that includes a tracking system to detect and track (e.g., using computer vision, or by tracking infrared or optical tracking markers) different body parts of the user 10 (e.g., head and hands) to obtain the sets of first and second pose data.

It should be understood that many various techniques may be used to obtain tracking data for different body parts of the user 10, and may be used to obtain the sets of first and second pose data.

The ray origin subsystem 302 processes the set of first pose data and the set of second pose data to generate a first origin and a second origin for casting first and second rays. The term origin in the present disclosure may refer to both the position from which a ray is casted, as well as the direction in which the ray is casted. The ray origin subsystem 302 may perform any suitable algorithm for converting the sets of first and second pose data into respective first and second origins. For example, the ray origin subsystem 302 may perform a direct mapping from the frame of reference of the respective set of first or second pose data to a common frame of reference of the XR environment 20 or physical environment 40 (e.g., using a transformation matrix).

The first origin may be determined in six DOF, and may be denoted as $[V_p, V_d]$, where $V_p$ denotes the Cartesian coordinates (also referred to as the x, y, z coordinates) representing the position of the first origin in a defined frame of reference (e.g., defined relative to the XR environment 20 or physical environment 40), and where $V_d$ denotes the Euler angles (also referred to as the azimuth, elevation and tilt angles) or quaternion representing the direction in which the first ray should be casted, in the defined frame of reference. Similarly, the second origin may be determined in six DOF, and may be denoted as $[H_p, H_d]$, where $H_p$ denotes the Cartesian coordinates (also referred to as the x, y, z coordinates) representing the position of the second origin in the defined frame of reference (e.g., defined relative to the XR environment 20 or physical environment 40), and where Ha denotes the Euler angles or quaternion representing the direction in which the second ray should be casted, in the defined frame of reference.

In some examples, the first origin and/or the second origin may be determined in three DOF (e.g., in some examples the set of first pose data or the set of second pose data may be insufficient for computing six DOF). If the first origin is determined in three DOF, the first origin may be assumed to be at a fixed position (e.g., $V_p$ may be fixed at (0,0,0)) and only $V_d$ is computed. Similarly, if the second origin is determined in three DOF, the second origin may be assumed to be at a fixed position that is different from a fixed position of the first original (e.g., $H_p$ may be fixed at (10,10,10)) and only $H_d$ is computed.

In some examples, the first origin and/or the second origin may be computed outside of the distal selection subsystem 300. In such cases, determining the first and second origins at step 402 may involve obtaining the first and second origins from outside of the distal selection subsystem 300. For example, if the computing system 100 is a wearable device (e.g., a HMD device, smart glasses, smart watch or smart ring) or is in communication with a wearable device, head or hand tracking hardware and/or software may be implemented as part of existing functions of the wearable device and the distal selection subsystem 300 may be provided with the first origin directly (without having to determine the first origin from the set of first pose data). In another example, if a handheld controller 102 or I/O device 106 is used, hand tracking hardware and/or software may be implemented as part of existing functions of the controller 102 or I/O device 106, and the distal selection subsystem 300 may be provided with the second origin directly (without having to determine the second origin from the set of second pose data). In another example, if the computing system 100 includes or is in communication with a tracking system to track the user 10 in the physical environment 40, the tracking system may implement tracking software as part of existing functions and may provide the first and second origins directly to the distal selection subsystem 300.

In some examples, at 404, the first ray and the second ray are casted from the first and second origins, respectively. For example, step 404 may be performed by executing the ray casting subsystem 304. The ray casting subsystem 304 receives the first and second origins ($[V_p, V_d]$ and $[H_p, H_d]$, respectively) and computes the path of the first and second rays, as casted from the first and second origin respectively. The ray casting subsystem 304 generates data (e.g., data representing a set of finite points along each ray) to enable the first and second ray to be visually rendered in the XR environment 20 (e.g., using any suitable 3D line drawing algorithm, such as Bresenham's line algorithm).

The ray casting subsystem 304 may use any suitable ray casting algorithm. Generally, a 3D ray can be casted from a given position and direction using the 3D line equation:

$$\langle x, y, z \rangle = \langle a, b, c \rangle + t\vec{v}$$

where (a, b, c) is point of the ray (corresponding to $V_p$ or $H_p$), $\vec{v}$ is the direction vector (computed from $V_d$ or $H_d$), t is a scalar parameter of the ray, and (x, y, z) are points on the ray. Every (x, y, z) point on the casted ray may be computed from a respective value of t, and t may take on any value from zero to infinity.

In some examples, the ray casting subsystem 304 may be configured to continuously cast the first and second rays to be rendered in the XR environment 20, such that the user 10 can visualize the changing position and direction of the first and second rays as the user 10 moves (e.g., moving the head and the hand). In other examples, an optional activation input (e.g., such as a button press or voice command) from the user 10 may be required to begin operation of the ray casting subsystem 304.

Step 404 may be performed to cast rays in the physical environment 40 also. For example, the computing system 100 may provide a view of the physical environment 40 via a display 104, and may render a visualization of the first and second rays in the physical environment 40, to enable the user 10 to better control the position and direction of the first and second rays. In this way, user interaction with the physical environment 40 may be assisted by an AR display on the computing system 100.

The first ray casted from the first origin may be denoted as $R_v$ and the second ray casted from the second origin may be denoted as $R_h$.

In some examples, if optional step 404 is not performed, the ray casting subsystem 304 may be omitted or disabled from the distal selection subsystem 300.

In some examples, at 406, a set of intersected objects is identified. For example, step 406 may be performed by executing the opacity subsystem 306. The opacity subsystem 306 receives the two casted rays $R_v$ and $R_h$, and identifies any objects in the XR environment 20 or physical environment 40 that are intersected by the first and second rays.

The opacity subsystem 306 may use any suitable algorithm for determining an intersection of a ray with an object (e.g., computing whether the equation representing the ray intersects with any boundary of the object). Techniques known in the field of ray casting may be used by the opacity subsystem 306 (e.g., using raycast hit-testing functions). Any objects intersected by the first ray and the second ray may be tracked by the opacity subsystem 306 and added to a list of intersected objects. Each intersected object may be identified by, for example, an object identifier (ID) or an instance ID. A single list may be generated, identifying the objects intersected by either the first ray, the second ray, or both rays. Alternatively, separate first and second lists may be generated, identifying the objects intersected by the first ray or the second ray, respectively.

For example, an intersected object list (e.g., in the form of an array) I may be generated, to identify the set of objects intersected by the first and/or second rays. Each object that is intersected by the first or second ray is added to the intersected object list. For example, if the first ray $R_v$ intersects objects $O_0$ and $O_1$, and the second ray $R_h$ intersects objects $O_1$ and $O_2$, the intersected object list will be $I=[O_0, O_1, O_2]$. The order in which objects are identified in the first and second lists may not be important, and it may not be necessary to identify which object was interested by which ray (or both rays). In some examples, the objects intersected by each ray may be separately tracked, to enable the opacity of intersected virtual objects to be adjusted differently for each ray, for example.

In some examples, step 406 may be omitted. For example, if the method 400 is being carried out for object selection in the physical environment 40, it may not be necessary to identify all objects intersected by the first and second rays because the opacity of real-world objects in the physical environment 40 cannot be adjusted.

In some examples, at 408, the opacity of each virtual object in the set of intersected objects is adjusted. For example, step 408 may be performed by executing the opacity subsystem 306 to change the opacity of each virtual object in the intersected object list I.

The opacity subsystem 306 adjusts the opacity of each virtual object in the set of intersected objects (e.g., as identified in the intersected object list) such that the intersected virtual objects are rendered with lower opacity in the XR environment 20. The user 10 may thus be able to view the path of the first and second rays through any occluding virtual objects. The opacity subsystem 306 adjusts the opacity of every virtual object included in the set of intersected objects, for example by changing the alpha value of each intersected virtual object to a set alpha value (e.g., an alpha value that is between 0.0 (i.e., fully transparent) and 1.0 (i.e., fully opaque), typically the set alpha value should be less than 1.0 to render the intersected virtual object to be translucent). In some examples, the alpha value may be changed dynamically by opacity subsystem 306, in response to user input (e.g., a user may select, using a button or other input mechanism, a lower opacity in order to better view the path of the casted rays).

In some examples, the opacity subsystem 306 may be configured to continuously update the objects in the set of intersected objects, and to adjust the opacity of intersected virtual objects in the XR environment 20, such that the user 10 can visualize the changing paths of the first and second rays as the user 10 moves (e.g., moving the head and the hand). In other examples, an optional activation input (e.g., such as a button press or voice command) from the user 10 may be required to begin operation of the opacity subsystem 306. If the first and/or second origin is changed (e.g., due to movement of the user's head and/or hand) so that a previously intersected virtual object is no longer intersected, the opacity subsystem 306 may remove that virtual object from the intersected object list and adjust the opacity of that virtual object to return to its original opacity. Thus, the opacity of virtual objects in the XR environment 20 may be continuously adjusted, to indicate which virtual objects are intersected by the first and second rays.

In some examples, step 408 may be omitted and the opacity of intersected virtual objects may not be adjusted. For example, other visual techniques may be used to indicate to the user 10 the location of the first and second rays (e.g., floating virtual arrows, rending the first and second rays as planes, etc.). It should be understood that the selection of a target object in the XR environment 20 or physical environment 40 is not necessarily dependent on identifying and adjusting the opacity of any intersected virtual objects.

In some examples, if steps 406 and 408 are omitted, the opacity subsystem 306 may be omitted or disabled from the distal selection subsystem 300.

By executing the ray casting subsystem 304 to render the first and second rays to be visualized, and/or by executing the opacity subsystem 306 to reduce the opacity of intersected virtual objects, the distal selection subsystem 300 enables the user 10 to more clearly target a desired object to select. The user 10 can adjust the first pose data and second pose data (e.g., by changing the position, orientation or pose of the head and hand) to control the first and second rays until the first and second rays intersect at a target object.

At 410, the intersection of the first and second rays is determined. For example, step 410 may be performed by executing the intersection subsystem 308. The determined intersection may be the computed actual intersection of the first and second rays, or if the first and second rays are skew (i.e., are not parallel but do not intersect) the determined intersection may be the computed projected intersection of the first and second rays. The determined intersection may be identified as a Cartesian coordinate in the frame of reference of the XR environment 20 or physical environment 40.

Figure 5:
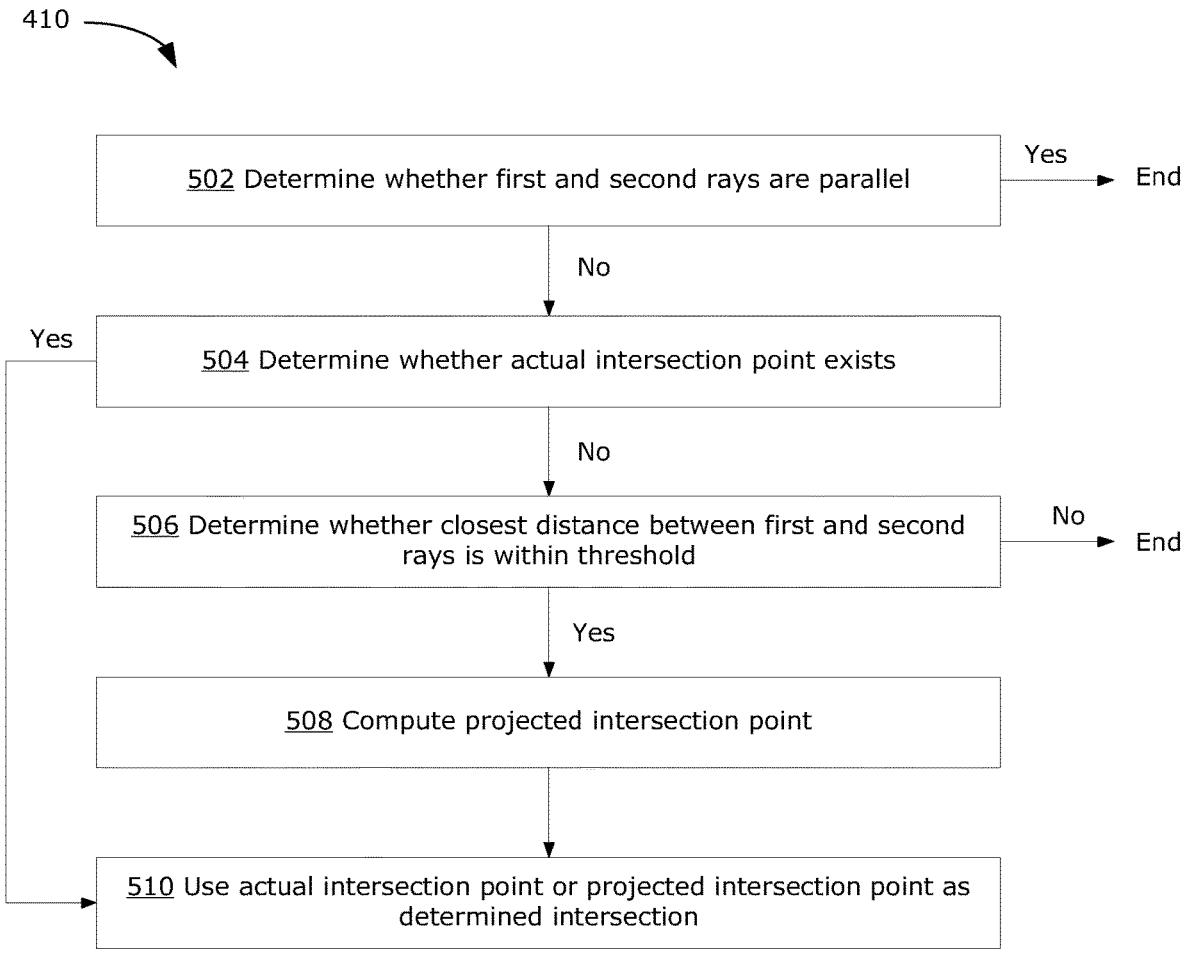
FIG. 5 is a flowchart illustrating an example method for determining an intersection of first and second rays, in accordance with examples of the present disclosure.

FIG. 5 is a flowchart illustrating example steps for carrying out step 410. The intersection subsystem 308 may perform the method illustrated in FIG. 5, for example, to carry out step 410.

At 502, it is determined whether the first and second rays are parallel. This may be performed using various techniques, such as by checking whether the direction vectors $V_d$ and $H_d$ are scalar multiples of each other. If the first and second rays are parallel, no intersection can be determined and the method ends without determining an intersection. Returning to FIG. 4, if no intersection is found at step 410, the method 400 may return to step 402 to continue tracking the first and second origins.

Returning to FIG. 5, if the first and second rays are determined to be not parallel, then at 504 it is determined whether there is an actual intersection point between the first and second rays. For any pair of rays that are not parallel and not skew, one unique intersection point P must exist. The intersection point may be computed using standard 3D line intersection algorithms. For example, the intersection subsystem 308 may use the following equation:

$$P = V_p \pm \frac{\|H_d \times \overrightarrow{V_p H_p}\|}{\|H_d \times V_d\|} V_d$$

where $V_p$ and $H_p$ denote the positions of the first and second origins, $V_d$ and $H_d$ denote the directional vectors of the first and second origins, and P is the actual intersection point of the first and second rays. After determining the actual intersection point, the method proceeds to step 510.

If the actual intersection between the first and second rays cannot be determined, then the first and second rays are skew and the method proceeds to step 506.

At 506, the closest distance between the first and second rays is computed and it is determined whether the closest distance is within a predefined threshold.

Any standard algorithm for computing the normal between two rays (or two lines) in 3D space may be used to compute the closest distance between the first and second rays. For example, the intersection subsystem 308 may use the following equation:

$$d = \frac{(V_d \times H_d) \cdot (V_p - H_p)}{\|V_d \times H_d\|}$$

where $V_p$ and $H_p$ denote the positions of the first and second origins, $V_d$ and $H_d$ denote the directional vectors of the first and second origins, and d is the shortest vector between the first and second rays. After computing the vector d, the magnitude of d can be computed to determine the closest distance between the first and second rays.

If the closest distance is within the predetermined threshold, then the intersection subsystem 308 determines that the first and second rays are sufficiently close enough to be considered as intersecting, and the method proceeds to step 508.

If the closest distance is not within the predetermined threshold, then the intersection subsystem 308 determines that the first and second rays are too far apart to be considered as intersecting, and no intersection can be determined. The method of FIG. 5 ends without determining an intersection. Returning to FIG. 4, if no intersection is found at step 410, the method 400 may return to step 402 to continue tracking the first and second origins.

The predetermined threshold for determining whether the first and second rays (which are skew) can be considered to be intersecting may be preset by default and/or may be user-selectable (e.g., a user may wish to adjust the threshold to be smaller to avoid accidentally selecting an unwanted object, in a densely populated XR environment 20 or physical environment 40; or a user may wish to adjust the threshold to be larger to enable easier selection of a target object).

In some examples, the predetermined threshold for determining whether the first and second rays can be considered to be intersecting may be variable, depending on the distance from the projected intersection point of the first and second rays to the first and second origins. When a ray is casted from its origin at an angle, a small change in angle at the origin translates to a large displacement of the ray at a distance far from the origin. Accordingly, the farther the ray is casted from the origin, more difficult it may be for a use to control the position of the ray at a distance with precision. The predetermined threshold may be set to account for this effect, for example by defining the predetermined threshold such that the predetermined threshold is smaller if the closest distance (i.e. the projected intersection point) between the first and second rays is computed close to the first and second origins (e.g., within a one meter radius from each of the first and second origins), larger if the closest distance (i.e. the projected intersection point) between the first and second rays is computed far from the first and second origins (e.g., farther than a 10 meter radius from each of the first and second origins), and a value in between otherwise (e.g., outside of a one meter radius but within a 10 meter radius from each of the first and second origins). The predetermined threshold may also be defined using an equation, such that the predetermined threshold gradually increases (e.g., linearly) as the distance from the closest distance (i.e. the projected intersection point) between the first and second rays to the first and second origins increases.

At 508, after determining that the closest distance between the first and second rays is within the predetermined threshold, a projected intersection point is computed. The projected intersection point may be computed as any selected point along the shortest vector between the first and second rays. For example, the projected intersection point may be computed as the midpoint of the shortest vector between the first and second rays. After computing the projected intersection point, the method proceeds to step 510.

At 510, the actual intersection point between the first and second rays (computed at step 504) or the projected intersection point (computed at step 508) is used as the determined intersection. Returning to FIG. 4, having determined the intersection of the first and second rays, the method 400 proceeds to step 412.

At 412, based on the determined intersection, a provisionally selected object in the XR environment 20 or physical environment 40 is identified. For example, step 412 may be performed by executing the intersection subsystem 308.

The determined intersection (which may be the actual intersection point of the first and second rays, or a projected intersection point between the first and second rays) may be defined by a 3D Cartesian coordinate in the frame of reference of the XR environment 20 or physical environment 40. The intersection subsystem 308 determines whether there is any object in the XR environment 20 or physical environment 40 coinciding with the determined intersection. For example, the intersection subsystem 308 may identify an object in the identified set of intersected objects (e.g., from step 406) that coincides with (e.g., encompasses or abuts (i.e., touches)) the determined intersection. In another example (e.g., if step 406 was omitted) the intersection subsystem 308 may identify an object in a list of known objects (e.g., a list of rendered virtual objects, a list of computer-enabled real-world objects, a list of detected real-world objects, or a combination thereof) that coincides with the determined intersection. For example, each object in the list of known objects may be associated with an object boundary defined in the frame of reference of the XR environment 20 or physical environment 40, and the intersection subsystem 308 may identify an object whose defined boundary encompasses or abuts the determined intersection. In another example, the intersection subsystem 308 may detect if there is any object at the location of the determined intersection (e.g., the intersection subsystem 308 may communicate with an object detection subsystem of the computing system 100 or communicate with an external tracking system to detect any object at the location of the determined intersection, for example using computer vision). The identified object is then identified as the provisionally selected object. There may be more than one provisionally selected object (e.g., more than one object in the set of intersected objects may touch the determined intersection, for example two objects may touch each other at the determined intersection).

In some examples, the intersection subsystem 308 may project a sphere having a predetermined or user-selectable radius from the determined intersection. The user may be able to dynamically select the radius of the projected sphere (e.g., using any suitable manual input mechanism, such as a joystick on the controller 102). Any object in the XR environment 20 or physical environment 40 that is coinciding with (e.g., at least partially encompassed by or abuts) the projected sphere may be identified as a provisionally selected object. There may be more than one provisionally selected object (e.g., more than one object be at least partially encompassed by or abut the projected sphere).

Virtual objects that have been provisionally selected in the XR environment 20 may be rendered in a manner (e.g., rendered in a different color) to visually indicate the provisional selection. In some examples, the user 10 may be provided with other suitable output (e.g., a display or audio output of an identifier, such as device name, of the provisionally selected object) to indicate the provisionally selected object to the user 10.

In some examples, no provisionally selected object may be identified (e.g., the determined intersection does not coincide with any object in the XR environment 20 or physical environment 40), in which case the method 400 may return to step 402. Alternatively, if no provisionally selected object has been identified, the determined intersection may be used to identify a provisionally selected 3D location in the XR environment 20 or physical environment 40. A user may, for example, select a 3D location in the XR environment 20 as a positional indicator for placing a virtual object, for example. In another example, a user may select a 3D location in the physical environment 40 as a positional indicator for controlling movement of a mobile robot being controlled by the computing system 100. Other such applications may be possible.

A provisionally selected location may be rendered in the XR environment 20 (e.g., by rendering a virtual arrow or other indicator) to visually indicate the provisional selection. In some examples, a provisionally selected location in the physical environment 40 may be indicated (e.g., by rendering a virtual arrow or other indicator) in a display 104 of the computing system 100, overlaid with a view of the physical environment 40.

At 414, confirmation of a selected object or location is received. In examples where there are more than a single provisionally selected object, the confirmation may be received as user input (e.g., a manual input, a voice command, eye-tracking input, etc.) indicating a selection of a specific one of the provisionally selected objects. In examples where there is a single provisionally selected object or location identified, confirmation of the selected object or location may be received as user input (e.g., a manual input, a voice command, etc.) or may be received by the provisionally selected object or location being maintained as provisionally selected (e.g., by the first and second origins being substantially unchanged) until expiry of a predetermined timer (e.g., for one second). The identification of the selected object (e.g., object ID) or location (e.g., 3D Cartesian coordinates corresponding to the determined intersection) is outputted by the distal selection subsystem 300.

The method 400 thus enables the identification of a selected object or selected location, based on first and second rays casted from respective first and second origins. The identification of the selected object or selected location may be used by another software application (e.g., another application that is executed to generate the XR environment 20, or another application that is executed to control a computer-enabled real-world object in the physical environment 40) to enable further user interaction with the selected object or selected location, for example.

The method 400, which may be performed by executing the distal selection subsystem 300, provides an object or location selection technique that may be considered to be occlusion invariant. By occlusion invariant, it is meant that the selection technique does not need to change depending on whether or not the target object or location to be selected is occluded by another object. Any virtual objects that would otherwise occlude the target object or location are rendered translucent. The use of first and second rays, casted from different first and second origins, may be referred to as cross-modal rays because each ray may correspond with a different mode of user control (e.g., the first ray may be casted from a first origin corresponding to a user's head, and the second ray may be casted from a second origin corresponding to a user's hand). The use of two individually controllable rays to determine an intersection for identifying a selected object or location may enable faster object or location selection (e.g., without requiring an additional disambiguation step), compared to some existing virtual object selection techniques.

Figure 6:
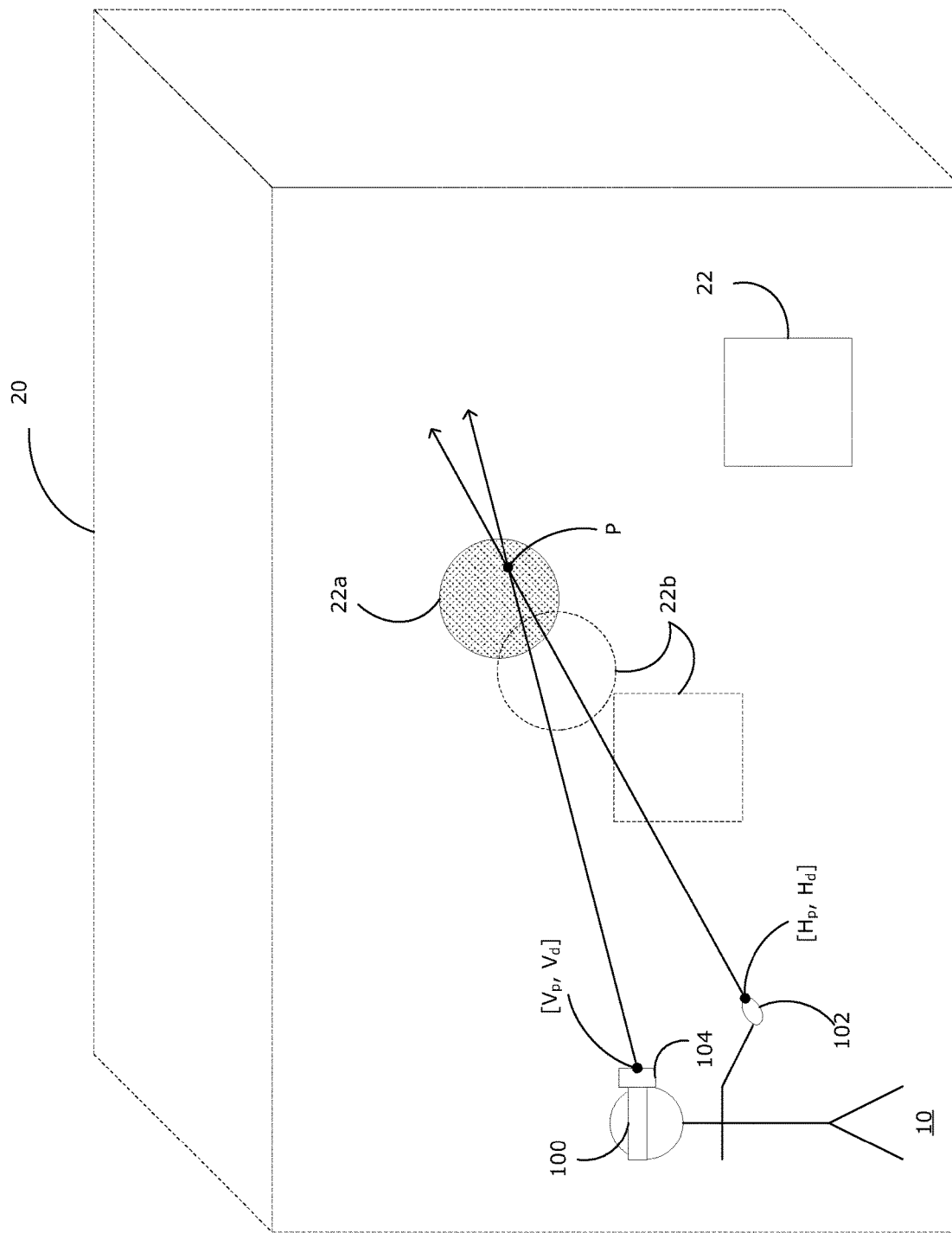
FIG. 6 illustrates an example implementation of the method of FIG. 4 in an XR environment.

FIG. 6 illustrates an example implementation of the method 400 in the XR environment 20, in which the method 400 is executed by a HMD device as the computing system 100, and where the computing system 100 interfaces with a handheld controller 102. FIG. 6 illustrates a simplified XR environment 20 that is provided as sensory input to the user 10, via the display 104.

In this simplified example, the XR environment 20 includes objects 22, including a target object 22a that is occluded (from the viewpoint of the user 10) by occluding virtual objects 22b.

In this example, the first origin $[V_p, V_d]$ is determined corresponding to the pose of the user's head (e.g., as tracked by the wearable computing system 100), and the second origin $[H_p, H_d]$ is determined corresponding to the pose of the user's hand (e.g., as tracked by the handheld controller 102). The first and second rays are casted from the respective first and second origins. The occluding virtual objects 22b, which are intersected by the first and/or second ray, are identified as the set of intersected objects. The opacity of the occluding virtual objects 22b is adjusted to render the occluding virtual objects 22b as translucent (indicated by dashed lines in FIG. 6). It may be noted that other virtual objects that are not intersected by the first and/or second ray are not rendered translucent.

An actual intersection point or projected intersection point between the first and second rays is determined, which is determined as the intersection P of the first and second rays. The target object 22a is identified as a provisionally selected object because the target object 22a coincides with the determined intersection of the first and second rays. The target object 22a may be rendered (e.g., using a distinct color, indicated by different shading in FIG. 6) to indicate the target object 22a is provisionally selected. The target object 22a is then identified as the selected object after receiving confirmation of the selection (e.g., the target object 22a remains provisionally selected after expiry of a timer).

FIG. 6 illustrates an example implementation of the methods and systems disclosed herein, using a HMD device as the computing system 100 and a handheld controller 102. Such an example may be relatively straightforward to implement, because head tracking is commonly performed by existing HMD devices, and hand tracking (with or without using a handheld controller 102) is also commonly performed by existing XR systems. However, as previously mentioned, the present disclosure is not limited to such implementations. Any two non-coincident positions may be tracked to determine the first and second origins. For example, the left and right hands of the user may be separately tracked for determining the first and second origins. In another example, the two body parts, for example heads or hands, of two separate users may be tracked for determining the first and second origins. In another example, two positions separated from each other on one wearable device or one handheld device may be separately tracked for determining the first and second origins (3DOF). A modality on the wearable device or handheld device, such as a joystick, scroll wheel, touchpad, may be used to change either one or both of the tracked origin's raycast directions, independently, so that the two rays may intersect. Other such variations may be possible. Other such variations may be possible.

Figure 7A:
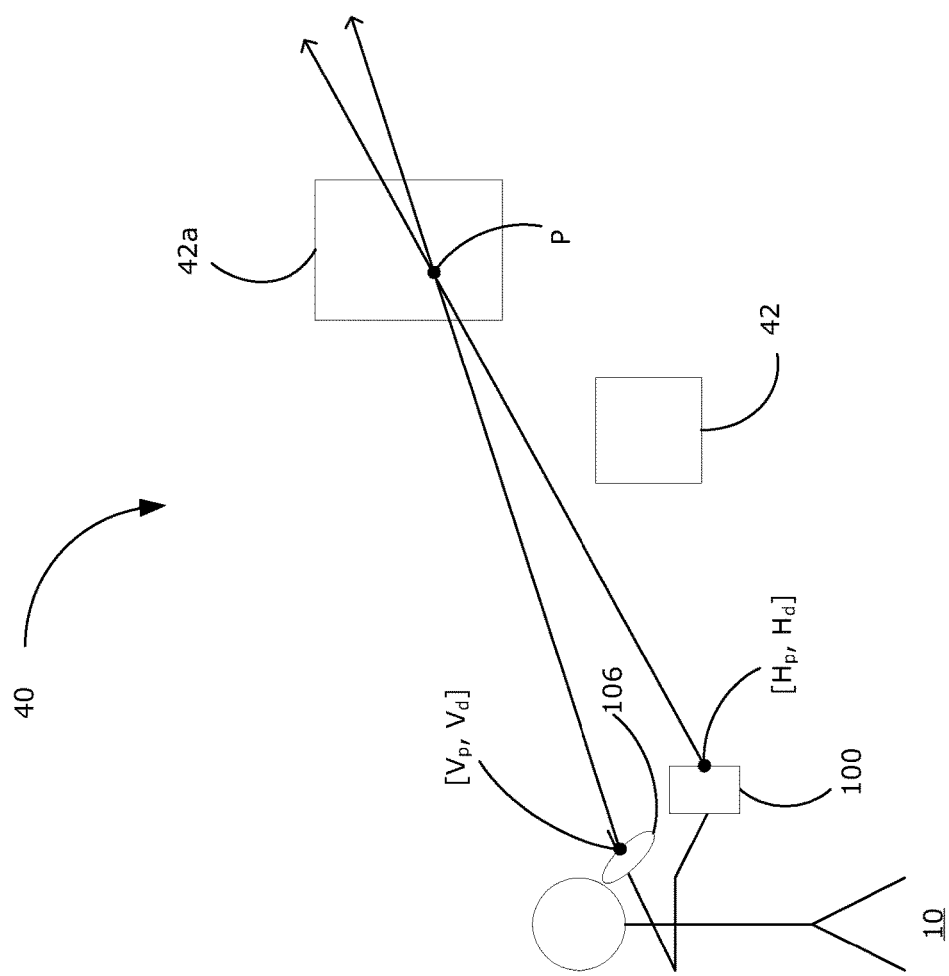
FIGS. 7A-7C illustrate other example implementations of the method of FIG. 4 in a physical environment.
Figure 7B:
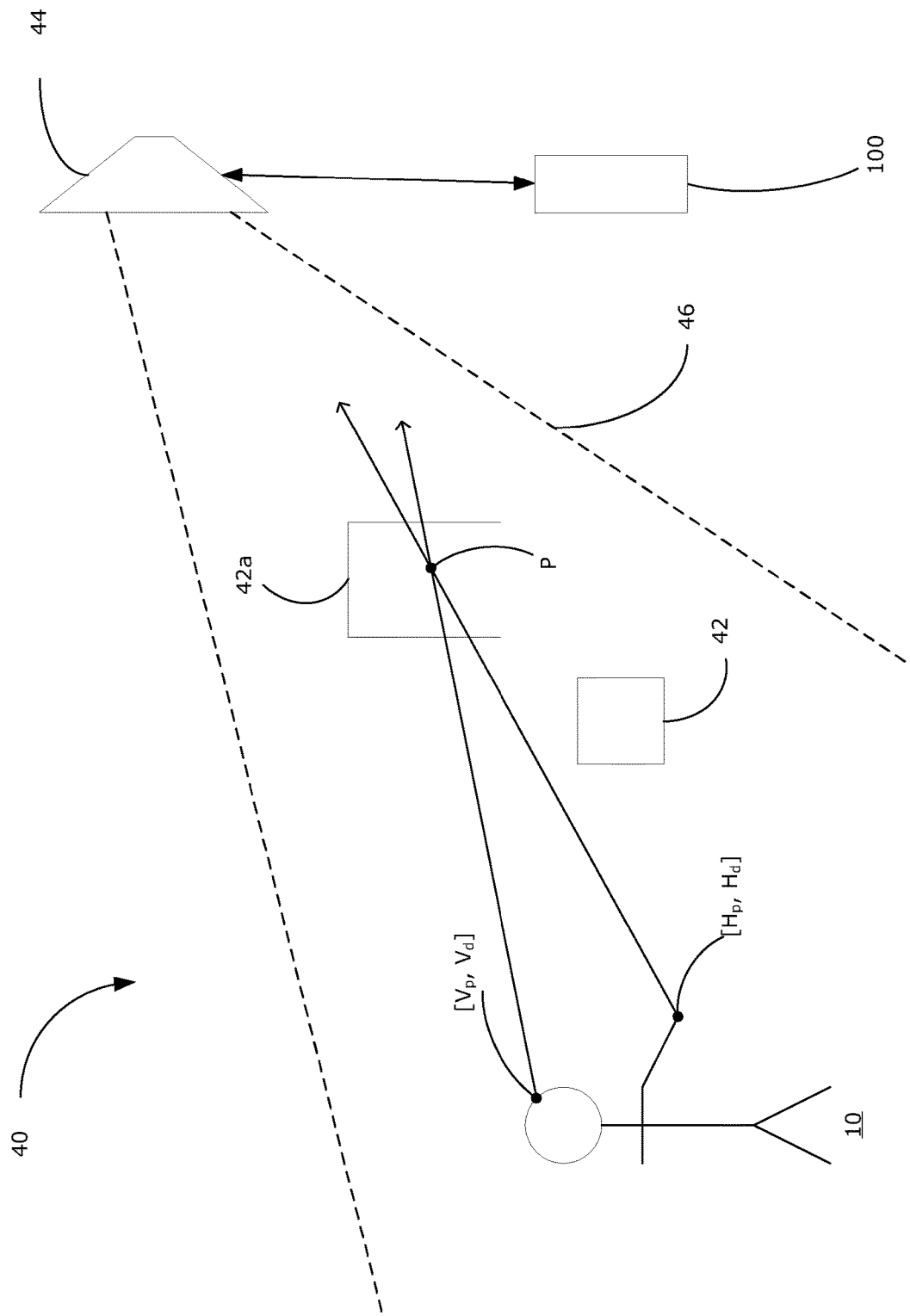
Figure 7C:
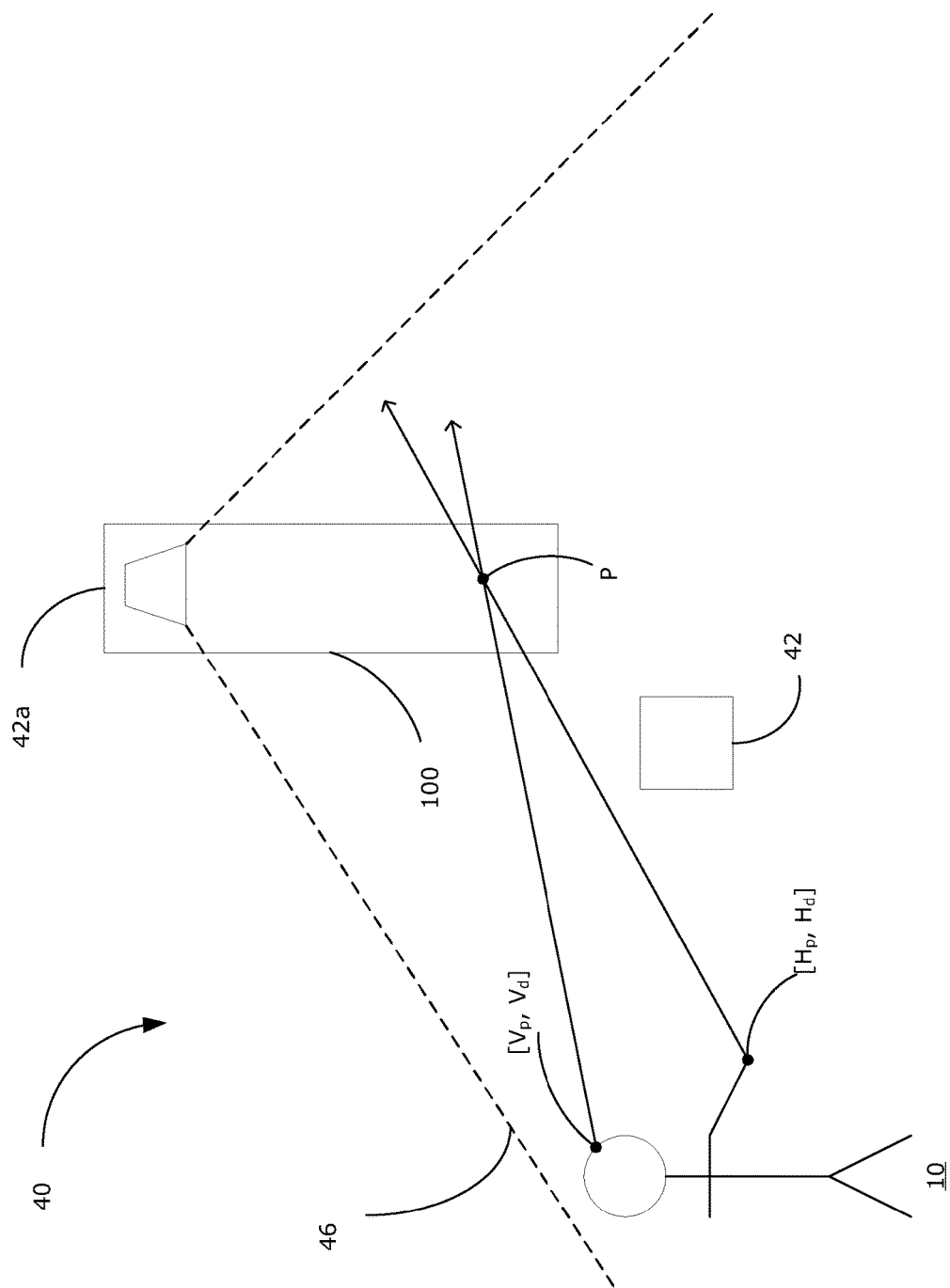

FIGS. 7A-7C illustrate example implementations of the method 400 in the physical environment 40.

In FIG. 7A, the method 400 is executed by handheld device (e.g., a smartphone or table) as the computing system 100, and where the computing system 100 interfaces with a wearable I/O device 106 (e.g., smart watch or smart ring). In this simplified example, the physical environment includes objects 42, including a target object 42a.

In this example, the first origin $[V_p, V_d]$ is determined corresponding to the pose of the user's right hand (e.g., as tracked by the handheld computing system 100), and the second origin $[H_p, H_d]$ is determined corresponding to the pose of the user's left hand (e.g., as tracked by the wearable I/O device 106). In other examples, the wearable I/O device 106 may be worn on any other body part (e.g., on the head, on the face, on the chest, on the hip, on the foot, etc.) and the second origin may correspond to the pose of that other body part. The first and second rays are casted from the respective first and second origins. The computing system 100 may render a visualization of the virtual first and second rays as an overlay on a view of the physical environment 40 (e.g., outputted via a display (not shown) of the computing system 100).

An actual intersection point or projected intersection point between the first and second rays is determined, which is determined as the intersection P of the first and second rays. The target object 42a is identified as a provisionally selected object because the target object 42a coincides with the determined intersection P of the first and second rays. An identification of the provisionally selected target object 42a may be outputted by the computing system 100 (e.g., an identification (e.g., device name) of the target object 42a may be displayed or spoken by the computing system 100). The target object 42a is then identified as the selected object after receiving confirmation of the selection (e.g., the target object 42a remains provisionally selected after expiry of a timer).

In FIG. 7B, the method 400 is executed by non-wearable, non-handheld device (e.g., a desktop device, a smart appliance, or a workstation) as the computing system 100, and where the computing system 100 communicates with an external tracking system 44 to enable tracking of the user 10 in the physical environment 40. The external tracking system 44 may, for example, include an optical camera, infrared camera, radar unit, Lidar unit, etc. to enable detection and tracking of body parts of the user 10 (e.g., using computer vision, tracking markers, or combination thereof). Although FIG. 7B illustrates the computing system 100 as being separate from the external tracking system 44, in other examples the computing system 100 may be integrated with the tracking system 44.

Similar to the example of FIG. 7A, the physical environment includes objects 42, including a target object 42a. The computing system 100 is capable of detecting and tracking objects 42 and the user 10 within a FOV 46. In this example, the first origin [$V_p$, $V_d$] is determined corresponding to the pose of the user's head (e.g., as tracked by the tracking system 44), and the second origin [$H_p$, $H_d$] is determined corresponding to the pose of the user's hand (as tracked by the tracking system 44). In other examples, the tracking system 44 may track any other two different body parts of the user 10 to determine the first and second origins. The tracking system 44 may communicate the first and second pose data, or the first and second origins to the computing system 100. The computing system 100 may render a visualization of the virtual first and second rays as an overlay on a view of the physical environment 40 (e.g., outputted via a display (not shown) of the computing system 100).

An actual intersection point or projected intersection point between the first and second rays is determined, which is determined as the intersection P of the first and second rays. The target object 42a is identified as a provisionally selected object because the target object 42a coincides with the determined intersection P of the first and second rays. An identification of the provisionally selected target object 42a may be outputted by the computing system 100 (e.g., an identification (e.g., device name) of the target object 42a may be displayed or spoken by the computing system 100). The target object 42a is then identified as the selected object after receiving confirmation of the selection (e.g., the target object 42a remains provisionally selected after expiry of a timer).

In FIG. 7C, the method 400 is executed by non-wearable, non-handheld device (e.g., a desktop device, a smart appliance, or a workstation) as the computing system 100, and where the computing system 100 includes a sensor (e.g., optical camera, infrared camera, radar unit, Lidar unit) to enable tracking of the user 10 in the physical environment 40.

The example of FIG. 7C is similar to the example of FIG. 7B. However, in the example of FIG. 7C, the computing system 100 is itself the target object 42a. For example, the computing system 100 may be a smart appliance (e.g., smart television, smart refrigerator, smart speaker, etc.). After the computing system 100 has identified itself as the target object 42a that is selected by the user 10, the computing system 100 may perform further operations (e.g., display a selection menu) to enable the user 10 to interact with the computing system 100.

In some examples, the distal selection subsystem 300 may be executed by a computing system 100 that is a desktop device. The desktop computing system 100 may communicate (e.g., via wired connection or wireless connection) with a display device (e.g., a wearable device, such as a HMD device) that provides the display 104. The computing system 100 may also communicate with a handheld controller 102, an I/O device 106 or an external tracking system 44. The computing system 100 may receive sensor data from the HMD device, I/O device 106, handheld controller 102 and/or external tracking system 44, which may be used to determine the first and second origins. The computing system 100 may provide commands to the display device to render the XR environment 20 (e.g., to change the opacity of any occluding virtual objects) or to provide a view of the physical environment 40, as discussed previously.

In some examples, the XR environment 20 may be rendered in a non-immersive way. For example, the computing system 100 may be a desktop device that renders the XR environment 20 as a 3D rendered scene on a desktop display 104 (e.g., a computer monitor). The first and second origins may be determined based on tracking the user's head (e.g., using eye tracking or head tracking software executing on the computing system 100) and tracking input from a hand-controlled input device (e.g., a mouse).

Other systems for tracking a user's head and/or hand, and/or for rendering the XR environment 20 may be possible within the scope of the present disclosure.

In various examples, the present disclosure describes systems and methods for selection of objects or locations in a 3D environment (including a 3D XR environment or a 3D physical environment), using two casted rays. By using the intersection (action intersection point or projected intersection point) of two rays casted in 3D, an object or location in the XR environment or physical environment may be identified as the selected object or location. The disclosed methods and systems may enable faster and more intuitive object or location selection, compared to some existing methods and systems.

The opacity of any occluding virtual objects in an XR environment may be adjusted (e.g., rendered translucent) to enable easier visualization of the target object or location to be selected. This also enables easier selection of the target object or location, because the user does not need to change the pose to avoid occluding virtual objects.

The present disclosure describes some example algorithms and equations for computing an actual 3D intersection point, and for computing a projected 3D intersection point. It should be understood that various different algorithms may be used for these computations.

Examples described herein may be applicable to augmented reality (AR), virtual reality (VR) and/or video gaming applications, among others. Examples described herein may also be applicable to interactions with smart devices, IoT devices, and/or smart appliances, among others.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
   obtaining a first origin, including a first position and a first direction, and a second origin, including a second position and a second direction;
   computing an intersection between a first ray casted from the first position and from the first direction of the first origin and a second ray casted from the second position and from the second direction of the second origin by computing an actual intersection point or a projected intersection point between the first ray and the second ray;
   identifying a selected object or selected location, based on the computed intersection between the first ray and the second ray; and
   outputting an identification of the selected object or the selected location.

2. The method of claim 1, wherein the selected object or the selected location is in an extended reality (XR) environment, the method further comprising:
   identifying at least one intersected virtual object in the XR environment that is intersected by at least one of the first ray or the second ray and that is not the selected object or the selected location; and
   adjusting opacity of the at least one intersected virtual object, to render the at least one intersected virtual object translucent.

3. The method of claim 1, wherein the computed intersection is the actual intersection point where the first ray and the second ray intersect each other.

4. The method of claim 1, wherein the computed intersection is the projected intersection point projected between the first ray and the second ray, the first and second rays being skew.

5. The method of claim 4, wherein computing the projected intersection point comprises:
   computing a shortest vector between the first ray and the second ray; and
   computing a point along the shortest vector as the projected intersection point.

6. The method of claim 5, further comprising:
   computing the point along the shortest vector after determining that a magnitude of the shortest vector is within a predefined threshold.

7. The method of claim 6, wherein the predefined threshold is relative to a distance between at least one of the first origin or the second origin to the projected intersection point.

8. The method of claim 1, wherein identifying the selected object or the selected location comprises:
   identifying one or more provisionally selected objects or provisionally selected locations, based on the computed intersection; and
   receiving confirmation of one selected object or one selected location from among the one or more provisionally selected objects or provisionally selected locations.

9. The method of claim 8, wherein identifying one or more provisionally selected objects or provisionally selected locations comprises:
   projecting a sphere at the computed intersection; and
   identifying the one or more provisionally selected objects or provisionally selected locations coinciding with the projected sphere.

10. The method of claim 1, wherein the first origin is obtained based on a tracked first position, orientation or pose of a first body part, and wherein the second origin is obtained based on a tracked second position, orientation or pose of a second body part.

11. The method of claim 1, wherein the selected object is a virtual object rendered in an extended reality (XR) environment, is a real-world object in the XR environment, or is a real-world object in a physical environment.

12. The method of claim 1, wherein the first origin and the second origin are obtained by at least one sensor including at least one of:
   a sensor of a handheld device;
   a sensor of a wearable device;
   a sensor of a smart device; or
   a sensor of a tracking system.

13. A computing system comprising:
   a processing device coupled to a memory storing machine-executable instructions thereon, wherein the instructions, when executed by the processing device, cause the computing system to:
      obtain a first origin, including a first position and a first direction, and a second origin, including a second position and a second direction;
      compute an intersection between a first ray casted from the first position and from the first direction of the first origin and a second ray casted from the first position and from the second direction of the second origin by computing an actual intersection point or a projected intersection point between the first ray and the second ray;
      identify a selected object or selected location, based on the computed intersection between the first ray and the second ray; and
      output an identification of the selected object or the selected location.

14. The computing system of claim 13, wherein the selected object or the selected location is in an extended reality (XR) environment, and wherein the instructions further cause the computing system to:
   identify at least one intersected virtual object in the XR environment that is intersected by at least one of the first ray or the second ray and that is not the selected object or the selected location; and
   adjust opacity of the at least one intersected virtual object, to render the at least one intersected virtual object translucent.

15. The computing system of claim 13, wherein the computed intersection is the actual intersection point of the first ray and the second ray.

16. The computing system of claim 13, wherein the computed intersection is the projected intersection point of the first ray and the second ray, the first and second rays being skew;
   wherein the instructions cause the computing system to compute the projected intersection point by:

computing a shortest vector between the first ray and the second ray; and computing a point along the shortest vector as the projected intersection point.

17. The computing system of claim 13, wherein the first origin is obtained r based on a tracked first position, orientation or pose of a first body part, and wherein the second origin is obtained by a tracked second position, orientation or pose of a second body part.

18. The computing system of claim 13, wherein the selected object is a virtual object rendered in an extended reality (XR) environment, is a real-world object in the XR environment, or is a real-world object in a physical environment.

19. The computing system of claim 13, wherein the computing system is one of:

a head-mounted display (HMD) device;

a wearable device;

a handheld device;

a smart device;

a tracking system; or a desktop device.

20. A non-transitory computer-readable medium having machine-executable instructions stored thereon, the instructions, when executed by a processing device of a computing system, cause the computing system to:

obtain a first origin, including a first position and a first direction, and a second origin, including a second position and a second direction;

compute an intersection between a first ray casted from the first position and from the first direction of the first origin and a second ray casted from the second position and from the second direction of the second origin by computing an actual intersection point or a projected intersection point between the first ray and the second ray;

identify a selected object or selected location, based on the computed intersection between the first ray and the second ray; and output an identification of the selected object or the selected location.

* * * * *

UNITED STATES PATENT AND TRADEMARK OFFICE
CERTIFICATE OF CORRECTION

PATENT NO. : 11,688,148 B2
APPLICATION NO. : 17/940435
DATED : June 27, 2023
INVENTOR(S) : Szu Wen Fan, Taslim Arefin Khan and Wei Li Page 1 of 1

It is certified that error appears in the above-identified patent and that said Letters Patent is hereby corrected as shown below:

In the Claims

Column 25, Line 6 Claim 17: "origin is obtained r based on a tracked first position, orien-" should read --origin is obtained based on a tracked first position, orien- --

Signed and Sealed this
Fifth Day of September, 2023

Katherine Kelly Vidal
*Director of the United States Patent and Trademark Office*